Figure 1:
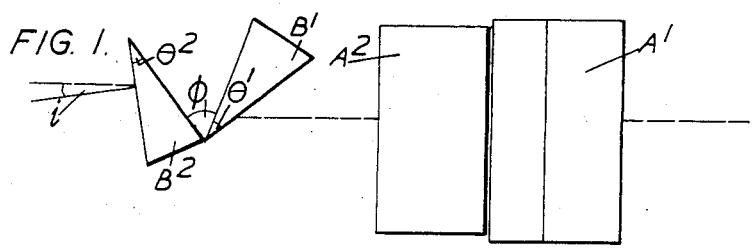

Inventor
KENNETH R. COLEMAN
By
*Attorneys*

July 9, 1957  K. R. COLEMAN  2,798,411
TWO MEMBER ANAMORPHOTIC PRISM SYSTEMS HAVING
THEIR OPERATIVE PLANES AT RIGHT ANGLES AND
AXIAL DEVIATION DIRECTIONS PARALLEL
Filed June 28, 1954  4 Sheets-Sheet 2

Inventor
KENNETH R. COLEMAN

By
Holcombe, Wetherill & Brisbois
Attorneys

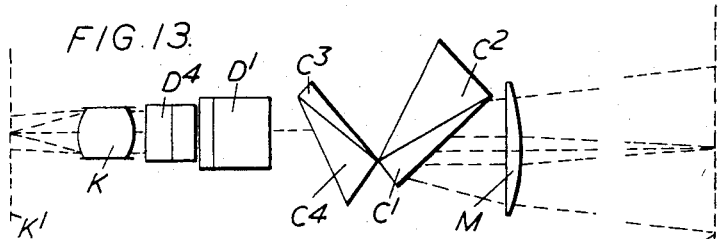
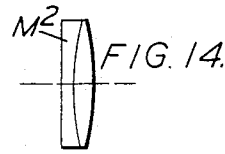
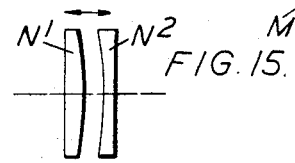
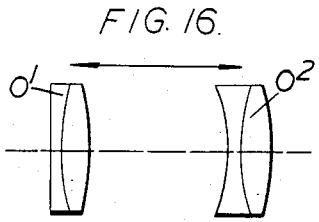
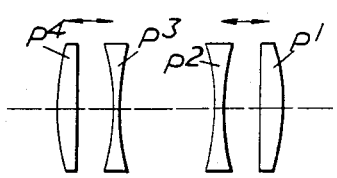
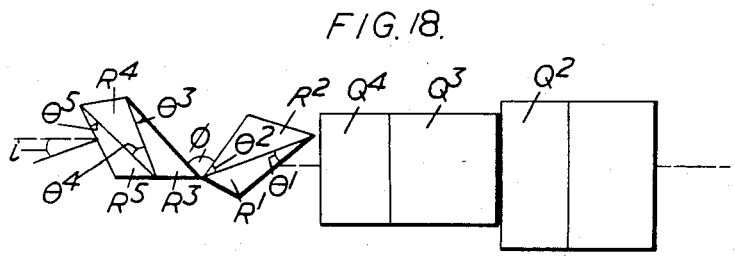
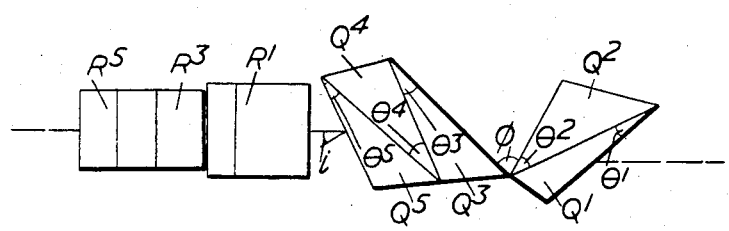
Inventor
KENNETH R. COLEMAN

2,798,411

TWO MEMBER ANAMORPHOTIC PRISM SYSTEMS HAVING THEIR OPERATIVE PLANES AT RIGHT ANGLES AND AXIAL DEVIATION DIRECTIONS PARALLEL

Kenneth Roy Coleman, Leicester, England, assignor to Taylor, Taylor & Hobson Limited, Leicester, England, a company of Great Britain Application June 28, 1954, Serial No. 439,821

Claims priority, application Great Britain April 12, 1954

25 Claims. (Cl. 88—57)

This invention relates to an anamorphotic optical system comprising refracting prism elements. In a known system of this kind two refracting prism components having their generators parallel to one another are so arranged that an incident ray is deviated in one sense by one prism component and in the other sense by the other component in an operative plane at right angles to such generators. The total deviation of an incident ray in such a system depends on its angle of incidence on the first prism surface, and the term "axial ray" is herein used to denote a ray which emerges from the prism system in a direction substantially parallel to its original direction of incidence. It is to be noted that an incident collimated beam composed of axial rays will not only be deviated by the prism component on which it is incident but will also be reduced (or enlarged) in cross-section, and this action will be repeated at the second prism component, the reduction (or enlargement) of course taking place only in a plane at right angles to the generators of the prisms, the dimensions of the beam at right angles to such plane remaining unaltered. This change in the width of an axial collimated beam may conveniently be termed "lateral pupil compression (or enlargement)." At the same time, the angle between two oblique incident rays will be decreased (or increased) in their passage through the prism system, in the operative plane at right angles to the prism generators, but will remain unaltered in a plane at right angles to such operative plane. Such change in angle may be termed "lateral angular compression (or enlargement)," and it is particularly to be noted that lateral pupil compression and lateral angular compression are operative in opposite senses, so that a beam passing through the system in one direction will suffer lateral pupil enlargement and lateral angular compression, whilst a beam passing through the system in the opposite direction will suffer lateral pupil compression and lateral angular enlargement. It will thus be clear that the system has an overall magnification factor in the operative plane equal to the reduction in width of the pupil, but leaves the dimensions and direction of a beam unaltered in the plane at right angles thereto.

The present invention has for its object to provide an anamorphotic optical system which can be employed in conjunction with a main objective having surfaces of revolution to increase the effective angular field of the objective for wide angle work.

The anamorphotic optical system according to the invention comprises two members, each consisting of two refracting prism components having their generators parallel to one another and so arranged that an incident ray will be deviated in one sense by one component and in the reverse sense by the other component in an operative plane at right angles to such generators, the prism generators in one member being arranged at right angles to those of the other member, whilst the two members are such that an axial ray incident on the first member which emerges from such member in a direction substantially parallel to its direction of incidence and is then incident on the second member will emerge therefrom in a direction substantially parallel to its direction of incidence.

The angular relationships between the prism surfaces in one member in its operative plane may be equal to those in the other member in its operative plane, the magnifications in the two operative planes being equal to one another, or alternatively, if desired, the members may be arranged to give different magnifications in the two operative planes.

The invention is applicable to a static arrangement giving a fixed magification or magnifications, or alternatively the system may be adjustable to give variable magnification over a wide range. Thus, the two prism components of each member may be angularly adjustable about axes parallel to the generators of the member to vary the magnification of the member. In such case, if there is equality in angular relationships between the two members in one position of adjustment, such equality is preferably maintained throughout the range of adjustment. The relative angular adjustments of the two prism components of each member are preferably such that for an incident ray which in one position of adjustment emerges substantially parallel to its original direction the deviations introduced by the rotation respectively of the two components are equal and opposite, whereby such incident ray will emerge from the system substantially parallel to its original direction in all positions of adjustment.

Each of the four prism components may consist of a single prism element, but it will usually be preferable to employ a compound prism for each component to facilitate correction of the aberrations of the system. Thus, each member may consist of two cemented prism pairs, in each of which the two prism elements have their apices pointing in opposite directions in the operative plane of the member, the apieces of the two inner prism elements pointing in the same direction. It is particularly convenient in such case, especially for a variable magnification arrangement, to employ the invention forming the subject of the present applicant's copending United States of America patent application Serial No. 428,616, filed May 10, 1954, according to which the portion of an axial ray within each prism element is inclined to the normal to the cemented surface at an angle which exceeds by at least five degrees the angle between such ray portion and the air-exposed surface of the prism element, the Abbé V number of the material of the rear prism element of each pair exceeding that of the associated front prism element by at least 10. (It should be made clear that the "front" of the prism system is the wide angle end, so that a beam passing through the system from the front to the rear suffers lateral angular compression in each member.) With this arrangement, it is usually preferable to arrange that each prism pair is approximately achromatised in one position in the range of adjustment (usually that which gives greatest magnification).

Alternatively, especially for a static fixed magnification arrangement, the invention forming the subject of the present applicant's copending United States of America patent application Serial No. 430,313, filed May 17, 1954, may be employed, according to which each compound prism component is arranged to depart from achromatism to such an extent that the difference between the deviations of an axial ray through the compound prism for the C and F spectrum lines lies between .01 and 0.1 of a degree.

The anamorphotic system according to the invention is more especially intended for use with collimated light and will usually therefore have a collimating lens system having spherical surfaces, in front of it. In order to accommodate different object distances, the components of the collimating lens system are preferably relatively adjustable to vary the equivalent focal length of the lens system. Thus, the collimating lens system may comprise two relatively movable components, one of which is convergent and the other divergent. Alternatively, the collimating lens system may comprise two stationary convergent components having between them two relatively movable divergent components. The two prism members and the collimating lens system will usually be located in front of a main objective.

Figure 2:
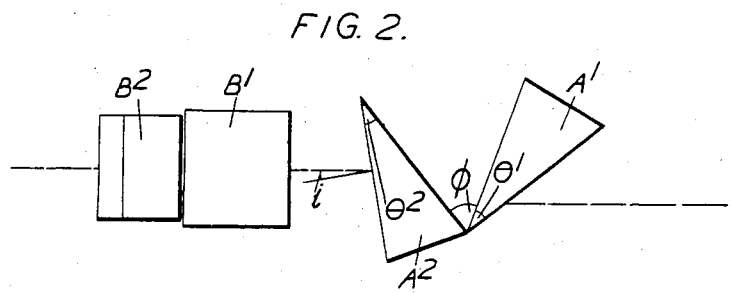
Figure 3:
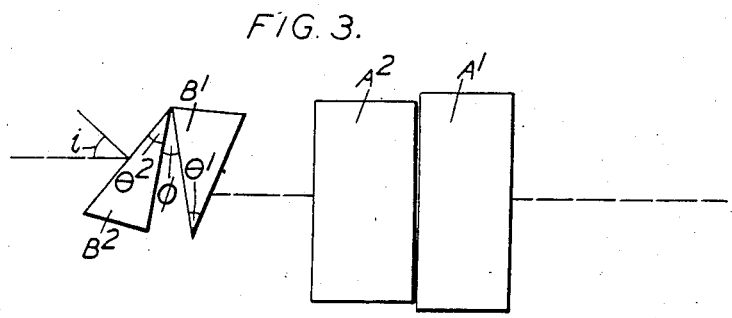
Figure 4:
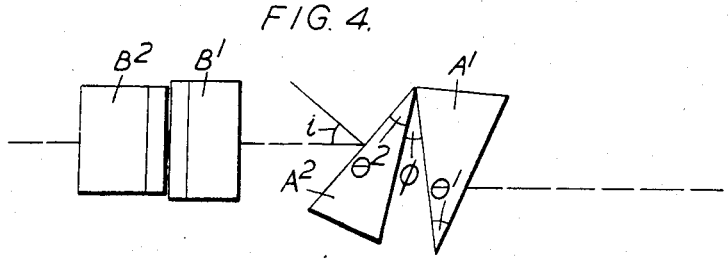
Figure 5:
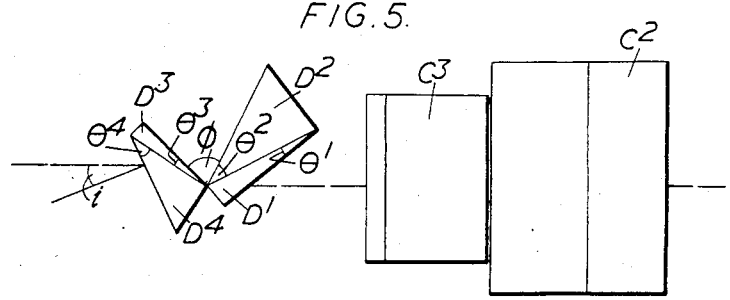
Figure 6:
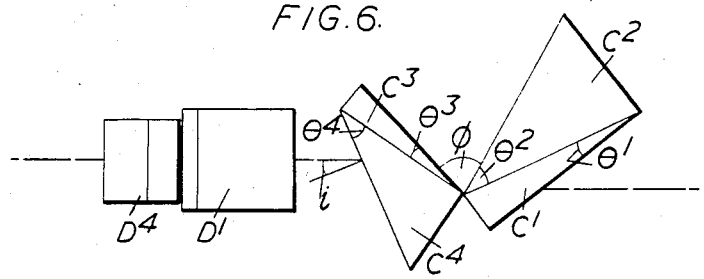
Figure 7:
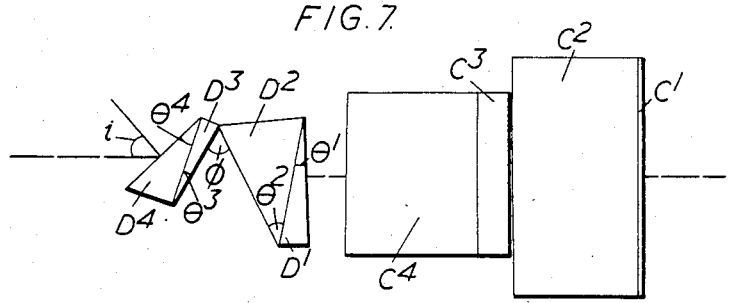
Figure 8:
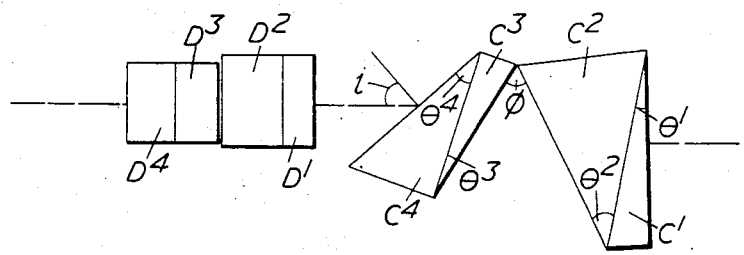
Figure 9:
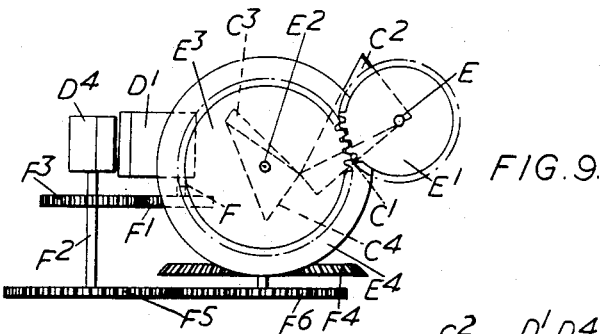
Figure 10:
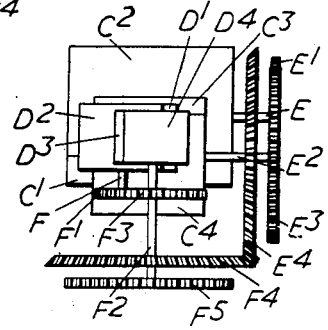
Figure 11:
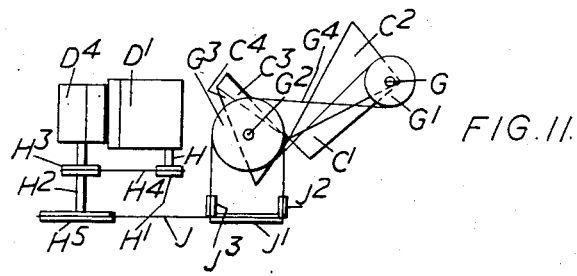
Figure 12:
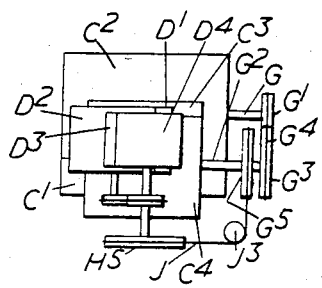

The invention may be carried into practice in various ways, but some convenient practical arrangements of anamorphotic system according thereto are illustrated by way of example in the accompanying drawings, in which:

Figure 1 shows in a plan view one arrangement of anamorphotic system employing simple prism components, shown in the position of highest magnification, Figure 2 is a side view of the arrangement of Figure 1, Figures 3 and 4 are plan and side views of the arrangement of Figures 1 and 2, shown in the position of lowest magnification, Figures 5–8 are views similar to those of Figures 1–4 of an alternative arrangement employing doublet prism components, Figures 9 and 10 are side and end views of the arrangement of Figures 5–8, showing one form of mechanism for inter-relating the movements of the prism components, Figures 11 and 12 are views similar to those of Figures 9 and 10 showing an alternative mechanism, Figure 13 illustrates the use of the anamorphotic system of Figures 5–8 in association with a main objective and a collimating lens, Figures 14–17 show four alternative forms of collimating lens for use in the system of Figure 13, and Figures 18 and 19 are plan and side views of a further alternating arrangement of anamorphotic system, especially intended as a static wide angle system.

In each of these arrangements, the anamorphotic system comprises a front member and a rear member, each consisting of two prism components, the generators of the prism surfaces in one member being parallel to one another and at right angles to those in the other member, and except for this turning through a right angle the front member is a replica of the rear member on a somewhat larger scale, the apex angle of each prism element in one member and its angular position relative to the other prism elements of the member being identical with those of the corresponding prism element in the other member. It will be convenient to refer to the side of either member towards which the apex of the prismatic air space between the two components points in the position of highest magnification as the "closed" side of the member.

Numerical data for these examples are given in the following tables. In each table, the first portion gives for each prism element of one member, counting from the front, the apex angle $\theta$ in the operative plane of the member, the mean refractive index $N_d$ for the $d$ spectrum line of the material of which the element is made and also the Abbé V number V of such material. The second portion of the table is concerned with angular adjustment of the prism components, and gives for a number of positions of adjustment the angle of incidence $i$ of an axial ray assumed for convenience to pass through the system from the rear to the front (the angle of incidence being the angle in the operative plane between the incident ray and the normal to the rear surface of the rear prism element of one member, the positive sign indicating that the incident ray is on the side of such normal remote from the closed side of the member and the negative sign that it is on the side of the normal nearer to the closed side), the angle $\phi$ in the operative plane between the front surface of the rear prism component and the rear surface of the front prism component, the positive sign indicating that the apex of the angle points towards the closed side and the negative sign that it points away from the closed side, and the magnification M of one member in the operative plane, the various angles all being given in degrees.

In the first example, shown in Figures 1–4, each prism component consists of a simple prism element. In each of the two members, the rear prism element $A^2$ or $B^2$ has its apex pointing away from the closed side of the member and the front prism element $A^1$ or $B^1$ has its apex pointing towards the closed side of the member.

*Example 1*

|  | $\theta$ | $N_d$ | V |
|---|---|---|---|
| Prism 1 | 32 | 1.48503 | 70.2 |
| Prism 2 | 28 | 1.48503 | 70.2 |

| $i$ | $\phi$ | M |
|---|---|---|
| +10 | +57.35 | 2.08 |
| +5 | +42.00 | 1.59 |
| 0 | +20.00 | 1.23 |
| −10 | +8.00 | 1.09 |
| −20 | −2.00 | 1.01 |
| −30 | −11.00 | .94 |
| −40 | −20.00 | .86 |

Although these data are given for one member only, they are equally applicable to both members, remembering of course that the operative planes for which the data are given are at right angles to one another in the two members. It can readily be shown, by tracing the ray through the system, that in each position of adjustment with the angles given the axial ray will emerge from the front surface of the rear member $B^1B^2$ in a direction parallel to its original direction of incidence on the rear surface thereof, the rear surface of the front member $A^1A^2$ being so located that such emergent ray will be incident thereon at the same angle of incidence and again will therefore emerge from the front surface of the front member $A^1A^2$ in a direction parallel to its original direction of incidence on the rear member $B^1B^2$. The rotational movements to change from one position of adjustment to another are identical for the corresponding prism elements in the two members. It can likewise be shown by such ray tracing that the width of an axial collimated beam in the operative plane in each member decreases from the rear to the front in a ratio corresponding to magnification in each position of adjustment. Similarly, the angle between two oblique rays increases from the rear to the front, and it is necessary, therefore, in order to accommodate such rays, to make the prism elements of the front member $A^1A^2$ appropriately larger than those of the rear member $B^1B^2$.

In the second example, shown in Figures 5–8, each prism component consists of a cemented prism pair $C^1C^2$ or $C^3C^4$ or $D^1D^2$ or $D^3D^4$, the apices of the two prism elements of each pair pointing in opposite directions. The two inner prism elements $C^2C^3$ or $D^2D^3$ in each member have their apices pointing towards the closed side of the member.

*Example II*

| | $\theta$ | $N_d$ | $V$ |
|---|---|---|---|
| Prism 1 | 12.0 | 1.61323 | 36.9 |
| Prism 2 | 36.5 | 1.50970 | 64.4 |
| Prism 3 | 10.95 | 1.61323 | 36.9 |
| Prism 4 | 31.5 | 1.50970 | 64.4 |

| $i$ | $\phi$ | $M$ |
|---|---|---|
| +23.8 | +72.5 | 1.97 |
| +20.0 | +61.1 | 1.63 |
| +15.0 | +45.4 | 1.36 |
| 0 | +14.0 | 1.08 |
| −25.0 | −10.0 | .95 |
| −40.0 | −25.0 | .85 |
| −50.0 | −56.2 | .65 |

In this example, the prism elements of each member are arranged in accordance with the invention of the copending application Serial No. 428,616 above mentioned, and it can readily be shown by tracing the rays that the portion of an axial ray in each prism element is much more steeply inclined to the normal to the adjacent cemented surface than to the normal to the adjacent air-exposed surface in all positions of adjustment. It will also be seen from the above table that the Abbé V number of the glass used for the rear prism element of each prism pair exceeds that for the front prism element by 27.5. It can likewise be shown by ray tracing that each prism pair is approximately achromatised in the position of highest magnification (shown in Figures 5 and 6) within the operative range.

With either of the above arrangements it is desirable to provide suitable mechanism to ensure the proper relationship between the adjusting movements of the four prism components. Such mechanism may take various forms.

Thus, in one arrangement, shown in Figures 9 and 10 as applied to the anamorphotic system of Figures 5–8, the front prism component $C^1C^2$ of the front member is mounted on a shaft E carrying a gear wheel $E^1$, which meshes with a gear wheel $E^3$ on a shaft $E^2$ on which the rear component $C^3C^4$ of the front member is mounted. Similarly, the front component $D^1D^2$ of the rear member is mounted on a shaft F carrying a gear wheel $F^1$, which meshes with a gear wheel $F^3$ on a shaft $F^2$ on which the rear component $D^3D^4$ of the rear member is mounted. The shafts $E^2$ and $F^2$ are geared together through a pair of meshing crown wheels $E^4$ and $F^4$ (the shaft $F^2$ being connected to the crown wheel $F^4$ through gears $F^5$ and $F^6$), the gear ratios being chosen to suit the requirements of the particular prism arrangement. In many instances, a 1:1 gear ratio between the two members will suit requirements.

In another arrangement, shown in Figures 11 and 12, the front component $C^1C^2$ of the front member is mounted on a shaft G carrying a pulley $G^1$, and the rear component $C^3C^4$ of the front member is mounted on a shaft $G^2$ carrying a pulley $G^3$, the two pulleys $G^1$ and $G^3$ being interconnected by means of a crossed steel tape $G^4$. Similarly, the front component $D^1D^2$ of the rear member is mounted on a shaft H carrying a pulley $H^1$ connected by a crossed steel tape $H^4$ to a pulley $H^3$ on a shaft $H^2$, on which the rear component $D^3D^4$ is mounted. The shafts $G^2$ and $H^2$ respectively carry further pulleys $G^5$ and $H^5$, which are interconnected by a steel tape J passing over idler pulleys $J^1J^2J^3$, the relative sizes of the various pulleys being chosen to suit requirements.

It will be appreciated that, if it is desired to employ different magnifications in the two members and to make the ratio of such magnifications variable, this may be effected either by omitting the gear or other connection $E^4F^4F^5F^6$ or $G^5H^5JJ^1J^2J^3$ between the two members and controlling them independently by hand as required, or by interposing variable gearing between the two members.

The anamorphotic system according to the invention is primarily intended for use in front of a main objective K (as shown in Figure 13), with a collimating lens system M in front of the prism members in order to collimate the rays passing through the prisms, the short conjugate plane $K^1$ of the complete arrangement being close behind the main objective K in the rear focal plane thereof, whilst the long conjugate plane $M^1$ is at a distance in front of the front nodal plane of the collimating lens system equal to the focal length of the collimating lens system. In the case of photography the rays will pass through the complete system from front to rear, whilst in the case of projection, the rays will pass from rear to front.

The collimating lens system may be arranged in various ways, and may be stationary, for use in a system having fixed conjugate planes or may have variable focal length to accommodate different long conjugate distances.

Thus, in one simple non-variable arrangement, the collimating lens system M consists of a single lens component, either simple (as shown in Figure 13) or compound (as shown at $M^2$ in Figure 14), the long conjugate distance L being equal to the equivalent focal length $f$ of the component.

In another arrangement, shown in Figure 15, the collimating lens system consists of a pair of components $N^1N^2$, one convergent and one divergent, usually simple and relatively close together. If the focal length is to be variable, the two components are relatively movable. In this case, the long conjugate distance L and the equivalent focal lengths $f_1$ and $f_2$ respectively of the two components $N^1$ and $N^2$ (the focal length $f_2$ of the divergent component $N^2$ being negative and the focal length $f_1$ of the convergent component $N^1$ positive) are interrelated by the equation $$\frac{1}{L}=\frac{1}{f_1}+\frac{1}{f_2}-\frac{d}{f_1 f_2}$$

where $d$ is the axial distance (fixed or variable as the case may be) between the adjacent nodal planes of the two components.

In a further alternative arrangement, shown in Figure 16, the collimating lens system consists of two components $O^1$ $O^2$, usually compound, one convergent and one divergent, having their adjacent nodal planes separated by a distance $d$ substantially equal to the difference between the positive values of the equivalent focal lengths $f_1$ and $f_2$ of the two components but capable of comparatively small adjustment for focussing purposes. The same equation $$\frac{1}{L}=\frac{1}{f_1}+\frac{1}{f_2}-\frac{d}{f_1 f_2}$$

governs this arrangement.

In yet another arrangement, shown in Figure 17, capable of a high degree of aberration correction for wide angle uses, the collimating lens system consists of four components $P^1P^2P^3P^4$, usually simple, of which the outer two $P^1$ and $P^4$ are convergent and the inner two $P^2$ and $P^3$ divergent. In this case, variability is achieved by moving the two divergent components $P^2$ and $P^3$ relatively to the convergent components between one extreme position in which they are close to one another, and another extreme position, in which they are respectively close to the two convergent components. The governing equation in this case is $$\frac{1}{L}=\frac{1}{F}+\frac{1}{F^1}-\frac{k}{FF^1}$$

where $$\frac{1}{F}=\frac{1}{f_1}+\frac{1}{f_2}-\frac{d_1}{f_1 f_2} \text{ and } \frac{1}{F^1}=\frac{1}{f_3}+\frac{1}{f_4}-\frac{d_2}{f_3 f_4}$$

the equivalent focal lengths of the four components being $f_1$, $f_2$, $f_3$ and $f_4$ respectively, counting from the front, whilst $d_1$ is the nodal separation of the front two components $P^1$ and $P^2$ and $d_2$ is the nodal separation of the rear two components $P^3$ and $P^4$, whilst $k$ is the nodal separation between the combination of the front two components $P^1P^2$ and the combination of the rear two components $P^3P^4$. With this arrangement, the corrections can be well maintained throughout the focussing range.

It will be appreciated that the foregoing arrangements have been given by way of example only and may be modified in various ways within the scope of the invention. Thus, for instance, when compound prisms are used, the invention has been described primarily with reference to the use for each member of a prism system of the kind described in the copending application Serial No. 428,616, which is especially suitable for giving a wide range of variation of magnification, but it will be understood that each member may, if desired, be of the kind described in the copending application Serial No. 430,313 this arrangement being preferred for a static wide angle arrangement or for a wide angle arrangement having a smaller range of variability of magnification.

One such arrangement is shown, by way of example, in Figures 18 and 19. In this arrangement, the front component of each member consists of a prism doublet $Q^1Q^2$ or $R^1R^2$, with the apex of the rear element $Q^2$ or $R^2$ pointing towards the closed side of the member and that of the front element $Q^1$ or $R^1$ away from such closed side, whilst the rear component of each member consists of a prism triplet $Q^3Q^4Q^5$ or $R^3R^4R^5$, with the apices of the two outer elements $Q^3Q^5$ or $R^3R^5$ pointing away from the closed side and the apex of the middle element $Q^4$ or $R^4$ pointing towards the closed side. Numerical data for either member for this example are given in the following table:

*Example III*

|  | θ | $N_d$ | V |
|---|---|---|---|
| Prism 1 | 13.03 | 1.62049 | 36.2 |
| Prism 2 | 35 | 1.50970 | 64.4 |
| Prism 3 | 22 | 1.50970 | 64.4 |
| Prism 4 | 24.83 | 1.60483 | 43.8 |
| Prism 5 | 22 | 1.50970 | 64.4 |

| i | φ | M |
|---|---|---|
| −27.5 | +78.54 | 2.00 |

This arrangement (although capable of rotational adjustment through relatively small angles to vary the magnification) is primarily intended for use as a static wide angle attachment. Each compound prism is arranged to depart from achromatism to such an extent that the difference between the deviations of an axial ray through the compound prism for the C and F spectrum lines lies between .01 and .1 of a degree. In the actual example, each compound prism acts to deviate the F-ray more than the C-ray (for the axial ray) by .016 of a degree, so that the difference between the deviations for these rays through either complete member is very small and amounts only to .0003 of a degree, the Abbé V number of the material of the front prism element of the front compound prism of each member being low, 36.2.

What I claim as my invention and desire to secure by Letters Patent is:

1. An anamorphotic optical system, comprising two members, each consisting of two refracting prism components having their generators parallel to one another wherein in an operative plane at right angles to such generators one member will deviate an incident ray in one sense and the other member will deviate such ray in the opposite sense, the prism generators in one member being arranged at right angles to those of the other member, the first member having its axial direction (that is the direction of an axial incident ray which emerges from the member substantially parallel to its direction of incidence) substantially parallel to the axial direction of the second member.

2. An anamorphotic optical system as claimed in claim 1, in which each of the four prism components consists of a cemented prism pair in which the apices of the two prism elements point in opposite directions in the operative plane, the apices of the two inner prisms of each member pointing in the same direction.

3. An anamorphotic optical system as claimed in claim 2, in which the portion of an axial ray within each prism element is inclined to the normal to the cemented surface at an angle which exceeds by at least five degrees the angle between such ray portion and the air-exposed surface of the prism element, the Abbé V number of the material of the rear prism element of each pair exceeding that of the associated front prism element by at least 10.

4. An anamorphotic optical system as claimed in claim 1, in which each of the four prism components consists of a compound prism.

5. An anamorphotic optical system as claimed in claim 1, in which each of the four prism components consists of a simple prism.

6. An anamorphotic optical system as claimed in claim 1, in which the angular relationships between the prism surfaces in one member in its operative plane are equal to those between the corresponding prism surfaces in the other member in its operative plane.

7. An anamorphotic optical system as claimed in claim 6, in which each of the four prism components consists of a compound prism.

8. An anamorphotic optical system as claimed in claim 6, in which each of the four prism components consists of a cemented prism pair in which the apices of the two prism elements point in opposite directions in the operative plane, the apices of the two inner prisms of either member pointing in the same direction.

9. An anamorphotic optical system as claimed in claim 6, in which each of the four prism components consists of a simple prism.

10. An anamorphotic optical system as claimed in claim 1, having means for angularly adjusting the two prism components of each member about axes parallel to the generators of the member for varying the magnification of the member.

11. An anamorphotic optical system as claimed in claim 10, in which the angular relationships between the prism surfaces in one member in its operative plane are equal to those between the corresponding prism surfaces in the other member in its operative plane in all positions of adjustment of the prism components.

12. An anamorphotic optical system as claimed in claim 11, in which, for an incident ray which is an axial ray in one position of adjustment, the deviations introduced by the adjustment respectively of the two components of each member are equal and opposite, whereby such incident ray remains an axial ray in all positions of adjustment.

13. An anamorphotic optical system as claimed in claim 12, in which each of the four prism components consists of a cemented prism pair in which the apices of the two prism elements point in opposite directions in the operative plane, the apices of the two inner prisms of either member pointing in the same direction.

14. An anamorphotic optical system as claimed in claim 13, in which the portion of an axial ray within each prism element is inclined to the normal to the cemented surface at an angle which exceeds by at least five degrees the angle between such ray portion and the air-exposed surface of the prism element, the Abbé V number of the material of the rear prism element of each pair exceeding that of the associated front prism element by at least 10, each prism pair being approximately achromatised in one position within the operative range of adjustment.

15. An anamorphotic optical system as claimed in claim 10, in which each of the four prism components consists of a compound prism, each prism pair being approximately achromatised in one position within the operative range of adjustment.

16. An anamorphotic optical system as claimed in claim 10, in which each of the four prism components consists of a cemented prism pair in which the apices of the two prism elements point in opposite directions in the operative plane, the apices of the two inner prisms of either member pointing in the same direction.

17. An anamorphotic optical system as claimed in claim 10, in which each of the four prism components consists of a simple prism.

18. An anamorphotic optical system, comprising two members, each consisting of two refracting prism components having their generators parallel to one another wherein in an operative plane at right angles to such generators one member will deviate an incident ray in one sense and the other member will deviate such ray in the opposite sense, the prism generators in one member being arranged at right angles to those of the other member, the first member having its axial direction (that is the direction of an axial incident ray which emerges from the member substantially parallel to its direction of incidence) substantially parallel to the axial direction of the second member, and a collimating lens having spherical surfaces located in front of the two members.

19. An anamorphotic optical system as claimed in claim 18, in which the collimating lens comprises a plurality of components, and means for relatively adjusting such components to vary the equivalent focal length of the collimating lens.

20. An anamorphotic optical system as claimed in claim 19, in which each of the four prism components consists of a compound prism.

21. An anamorphotic optical system as claimed in claim 19, in which the angular relationships between the prism surfaces in one member in its operative plane are equal to those between the corresponding prism surfaces in the other member in its operative plane.

22. The combination with the anamorphotic optical system claimed in claim 19, with a main objective located behind such system.

23. An anamorphotic optical system as claimed in claim 18, in which the collimating lens comprises two components respectively convergent and divergent, and means for relatively adjusting such components to vary the equivalent focal length of the collimating lens.

24. An anamorphotic optical system as claimed in claim 18, in which the collimating lens comprises four components of which the outer two are convergent and the inner two divergent, and means for adjusting the two divergent components relatively to the convergent components to vary the equivalent focal length of the collimating lens.

25. The combination with the anamorphotic optical system claimed in claim 18, with a main objective located behind such system.

References Cited in the file of this patent

UNITED STATES PATENTS

| | | |
|---|---|---|
| 818,553 | Phillips | Apr. 24, 1906 |
| 1,307,598 | Phillips | June 24, 1919 |
| 1,647,631 | Ives | Nov. 1, 1927 |
| 1,680,534 | Barbutt | Aug. 14, 1928 |
| 1,758,801 | Moses | May 13, 1930 |
| 1,840,799 | Waddell | Jan. 12, 1932 |
| 1,898,787 | Newcomer | Feb. 21, 1933 |
| 1,905,442 | Coors | Apr. 25, 1933 |
| 1,931,992 | Newcomer | Oct. 24, 1933 |
| 1,932,082 | Newcomer | Oct. 24, 1933 |
| 2,023,217 | Benford | Dec. 3, 1935 |
| 2,048,284 | Newcomer | July 21, 1936 |
| 2,088,660 | Newcomer | Aug. 3, 1937 |

FOREIGN PATENTS

| | | |
|---|---|---|
| 8,512 | Great Britain | of 1898 |
| 271,963 | Great Britain | June 7, 1927 |
| 338,962 | Great Britain | Dec. 1, 1930 |